Figure 1:
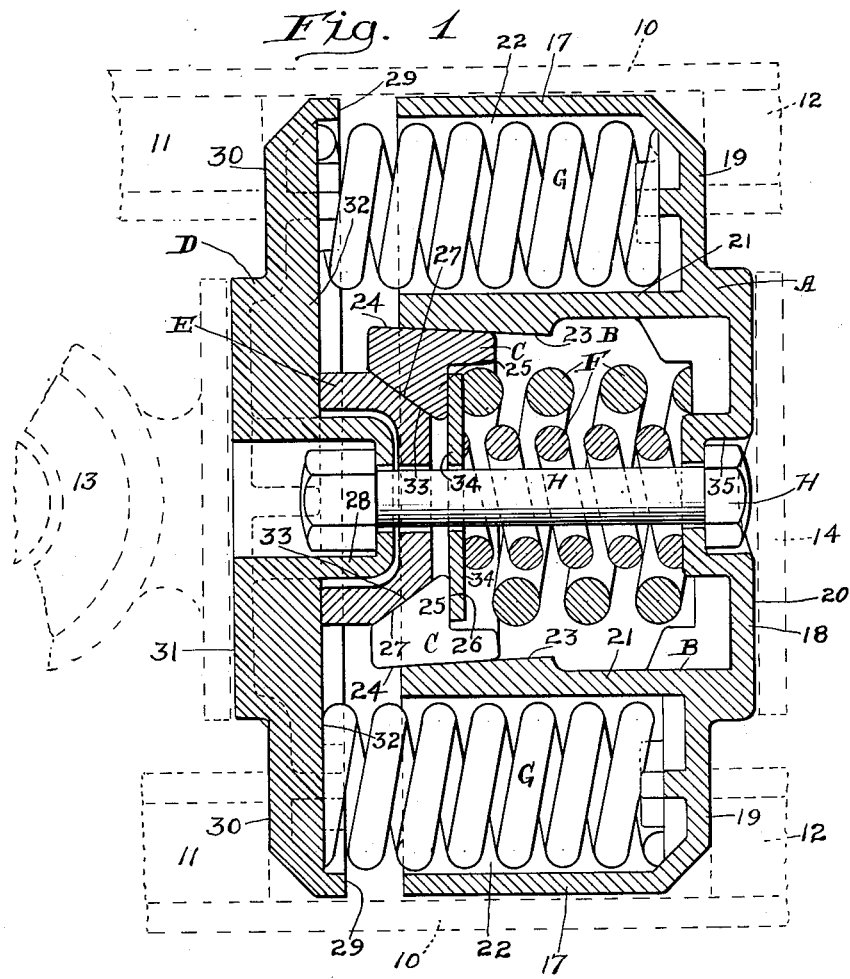

June 6, 1950   G. E. DATH   2,510,278
FRICTION SHOCK ABSORBING MECHANISM
Filed Dec. 15, 1947   2 Sheets-Sheet 1

Inventor:
George E. Dath.
By Henry Fucks
Atty.

June 6, 1950  G. E. DATH  2,510,278
FRICTION SHOCK ABSORBING MECHANISM
Filed Dec. 15, 1947  2 Sheets—Sheet 2
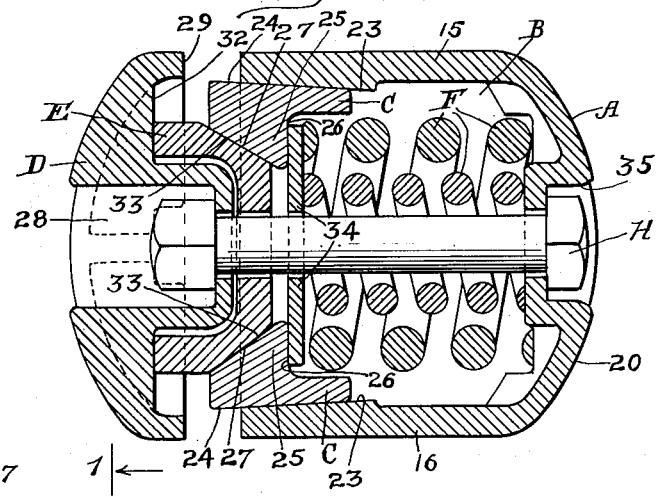
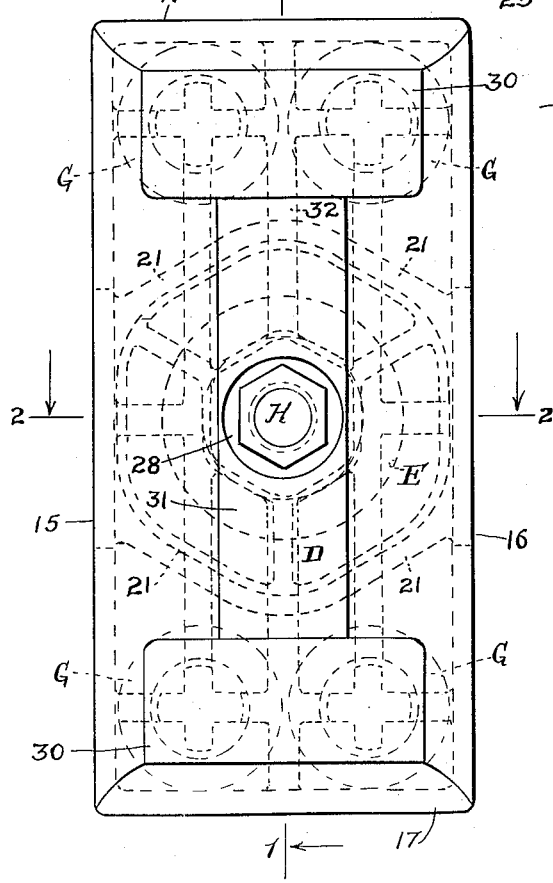
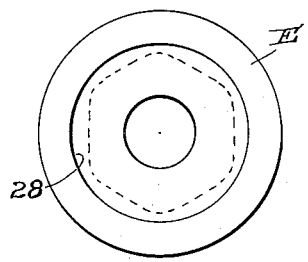
Inventor:
George E. Dath
By Henry Fuchs.
Atty.

Patented June 6, 1950

2,510,278

UNITED STATES PATENT OFFICE 2,510,278

FRICTION SHOCK ABSORBING MECHANISM

George E. Dath, Mokena, Ill., assignor to W. H. Miner, Inc., Chicago, Ill., a corporation of Delaware Application December 15, 1947, Serial No. 791,783

6 Claims. (Cl. 213—32)

This invention relates to improvements in friction shock absorbing mechanisms more particularly adapted for draft riggings of railway locomotives and cars.

One object of the invention is to provide a friction shock absorbing mechanism of relatively high capacity, especially adapted for railway draft riggings having relatively short pockets for accommodating the mechanism.

A further object of the invention is to provide a friction shock absorbing mechanism adapted for relatively short draft rigging pockets, including a friction casing, friction shoes slidingly telescoped within the casing, a pressure transmitting wedge member for spreading the shoes apart into tight frictional engagement with the interior friction surfaces of the casing and forcing the shoes inwardly of the casing, a follower bearing on the wedge, and spring means within the casing yieldingly opposing inward movement of the friction shoes, wherein the friction casing is contained within a spring cage and movement of the follower inwardly toward the friction casing is opposed by additional spring means contained within the spring cage, thereby adding materially to the shock absorbing capacity of the mechanism.

Other objects of the invention will more clearly appear from the description and claims hereinafter following.

In the accompanying drawings forming a part of this specification, Figure 1 is a horizontal sectional view of my improved friction shock absorbing mechanism, corresponding substantially to the line 1—1 of Figure 3, showing the same in applied position, a portion of the draft gear pocket and a portion of the yoke of the draft rigging being shown in dotted lines. Figure 2 is a longitudinal, vertical sectional view of the friction shock absorbing mechanism shown in Figure 1, corresponding substantially to the line 2—2 of Figure 3. Figure 3 is a front elevational view, looking from left to right in Figure 2. Figure 4 is a front elevational view of the wedge member shown in Figure 2, looking from left to right in said figure.

My improved friction shock absorbing mechanism, as illustrated in the drawings, comprises broadly a spring cage A; a friction casing B; three friction shoes C—C—C; a front follower D; a wedge member E; a spring resistance F within the friction casing opposing inward movement of the shoes, front follower, and wedge member; additional sets of springs G—G and G—G contained within the spring cage opposing inward movement of the follower; and a retainer bolt H.

The improved friction shock absorbing mechanism is illustrated in the drawings as contained in the usual draft gear pocket of the underframe structure of a railway locomotive or car, a portion of such underframe structure being shown in dotted lines in Figure 1 and generally indicated by 10. The underframe structure 10 is of the type usually employed in locomotives and presents front and rear stop shoulders or lugs 11—11 and 12—12. The rear end portion of the usual coupler shank, shown in dotted lines, is indicated by 13, to which is operatively connected a yoke 14 of well-known construction, also shown in dotted lines. The yoke 14 supports the improved friction shock absorbing mechanism within the draft gear pocket between the front and rear stop lugs 11—11 and 12—12 and transmits the draft and buffing forces thereto.

The spring cage A of my improved friction shock absorbing mechanism is in the form of a rectangular boxlike member, open at its front end and having spaced, horizontally disposed, top and bottom walls 15 and 16, spaced vertical side walls 17—17, and a transverse rear wall 18. The rear wall 18 presents substantially flat, vertically disposed abutment faces 19—19 on the outer side at opposite sides thereof adapted to cooperate with the rear stop lugs 12—12, and a rounded rear surface 20 therebetween, which cooperates with the inner side of the rear end of the yoke 14 which is correspondingly rounded to swivel thereon.

The friction casing B is formed integral with the cage A and projects from the rear wall thereof, being disposed centrally between the side walls 17—17 of the cage. The casing B is of hexagonal, transverse cross section, two of the opposite parallel walls thereof being formed by the central portions of the top and bottom walls 15 and 16 of the cage A, and the remaining four walls of the same being formed by a pair of connecting webs 21—21, extending from the wall 15 to the wall 16 and formed integral therewith and with the rear wall 18 of the cage A. The webs 21—21 are of V-shaped transverse section, each web forming two diverging walls of the hexagonal casing B. The webs 21—21 also divide the spring cage A into sections, the sections at opposite sides of the casing B forming spring pockets 22—22. At the outer or open end thereof, the casing B is provided with three interior, inwardly converging friction surfaces 23—23—23 of V-shaped transverse section, each surface 23 being formed by two of the diverging adjacent walls of the hexagonal casing. As shown in Figure 1, the front end of the casing B is preferably flush with the front end of the spring cage A.

The friction shoes C, which are three in number, are slidingly telescoped within the open end of the casing B. Each shoe C has a friction surface 24 of V-shaped, transverse section on its outer side engaging with one of the V-shaped surfaces 23 of the casing B. Each shoe C is laterally inwardly enlarged at the forward end portion thereof, as indicated at 25, thus providing a transversely extending abutment face 26 on said shoe at the rear end of the enlargement. The enlargement 25 of each shoe presents a wedge face 27 on the inner side thereof, which is of V-shaped transverse section. The wedge faces 27—27—27 of the three shoes C—C—C converge inwardly of the casing B.

The front follower D comprises a relatively heavy, substantially rectangular plate, having a rearwardly or inwardly extending, central projection in the form of a boss 28 thereon, which is located centrally between the opposite ends of the plate. The boss 28 is preferably hollow, as shown, and of circular cross-section and provides a pocket for anchoring the retainer bolt H. The plate portion of the follower D overlaps the top, bottom, and opposite side walls of the spring cage A and is provided with an inwardly directed, peripheral flange which extends from the top, bottom, and side edges thereof and presents a flat end face 29 engageable with the outer end of the cage A to limit movement of the follower inwardly toward the cage. At the forward side, the follower D presents substantially flat, vertically disposed abutment faces 30—30 at opposite ends thereof cooperating with the front stop lugs 11—11. The front surface of the follower D between the faces 30—30 is rounded, as indicated at 31, to fit the inner side of the vertical front end member of the yoke. On the inner side, the follower D is provided with intersecting ribs 32—32 which form abutment means for the wedge E and the springs G—G.

The wedge E is in the form of a hollow block engaged over the boss 28 of the follower D and has its outer end bearing on the ribs 32—32 of said follower. The wedge E presents three rearwardly extending, exterior wedge faces 33—33—33 of V-shaped transverse section, correspondingly inclined to and engaging respectively with the wedge faces 27—27—27 of the shoes C—C—C.

The spring resistance F comprises a relatively light inner coil and a heavier outer coil arranged within the casing B and interposed between the closed rear end of the casing formed by the wall 18 of the spring cage A and the friction shoes C—C—C, having their front or outer ends bearing on a spring follower disc 34 engaging the abutment faces 26 of the shoes.

The springs G—G and G—G are contained within the spring cage A, being arranged in pairs at opposite sides of the friction casing B within the spring pockets 22—22. The springs G—G of each pair bear at opposite ends, respectively, on the rear wall 18 of the spring cage and the inner side of the follower D, and yieldingly oppose relative approach of the follower D and the spring cage A.

The mechanism is held assembled by the retainer bolt H, which extends through the follower disc 34, the wedge E, and the boss 28 of the follower D and has its opposite ends anchored respectively in the pocket of said boss and an inwardly projecting hollow boss 35 on the wall 18 of the cage A.

The operation of my improved friction shock absorbing mechanism is as follows: Upon outward movement of the coupler in draft, the yoke pulls the spring cage A forwardly, compressing the mechanism against the front stop lugs 11—11 and forcing the cage A toward the follower D and wedge E, the wedge E and follower D being held stationary by the front stop lugs. In buff, the coupler is moved inwardly, carrying the yoke therewith and compressing the mechanism against the rear stop lugs 12—12, the follower D and the wedge E being forced rearwardly toward the spring cage A and the latter being held against rearward movement by the stop lugs 12—12. As the follower D, together with the wedge E and the cage A are moved lengthwise of the mechanism with respect to each other in either draft or buff, the springs G—G and G—G are compressed between the follower D and the rear wall of the spring cage A and the wedge E moves inwardly of the friction casing B, wedging the shoes apart and also forcing the same rearwardly of the casing, against the resistance of the spring resistance F. High frictional resistance is thus produced, in addition to the resistance provided by the four springs G—G—G—G. Compression of the mechanism continues until inward movement of the follower D and wedge E is limited by engagement of the face 30 of the abutment flange of the follower D with the front end of the spring cage A, thereby preventing overcompression of the springs. When the actuating force is reduced, the springs return all of the parts to the normal full release position shown in Figures 1 and 2, the springs G—G—G—G acting to directly force the follower D outwardly and the spring resistance F, also acting to force the same outwardly by projecting the shoes which are in wedging engagement with the wedge E, which, in turn, bears on the follower D, separation of the follower D and cage A being limited by the retainer bolt H.

I claim:

1. In a friction shock absorbing mechanism, the combination with a spring cage; of a follower; a wedge member movable with said follower toward said cage; a friction casing within said spring cage rigid with the same, said casing having interior friction surfaces; friction shoes within the casing slidable on the friction surfaces thereof; cooperating wedge faces on said shoes and wedge member; a spring within the casing yieldingly opposing inward movement of the shoes; and spring means within said spring cage at opposite sides of the friction casing yieldingly opposing inward movement of said follower.

2. In a friction shock absorbing mechanism, the combination with a spring cage; of a combined follower and wedge unit, said cage and unit being relatively movable toward and away from each other; a friction casing within said spring cage rigid with the same, said casing having interior friction surfaces; friction shoes within the casing slidable on the friction surfaces thereof; cooperating wedge faces on said shoes and the wedge of said unit; a spring within the casing yieldingly opposing inward movement of the shoes; and two pairs of springs within said cage, said pairs being disposed at opposite sides of the friction casing and yieldingly opposing inward movement of the follower of said unit.

3. In a friction shock absorbing mechanism, the combination with a spring cage; of a combined follower and wedge unit, said cage and unit being relatively movable toward and away from each other; a friction casing within said spring cage rigid with the same, said casing having interior friction surfaces; friction shoes within the casing slidable on the friction surfaces thereof; cooperating wedge faces on said shoes and the wedge of said unit; a spring within the casing yieldingly opposing inward movement of the shoes; and additional springs within said spring cage, exterior to said casing, directly opposing inward movement of the follower of said unit.

4. In a friction shock absorbing mechanism, the combination with a spring cage; of a combined follower and wedge unit, said cage and unit being relatively movable toward and away from each other; a friction casing within said spring cage rigid with the same, said casing having interior friction surfaces; friction shoes within the casing slidable on the friction surfaces thereof; cooperating wedge faces on said shoes and the wedge of said unit; a spring within the casing yieldingly opposing inward movement of the shoes; and additional spring means directly opposing inward movement of the follower of said unit, said additional spring means comprising springs arranged in pairs within the spring cage at opposite sides of said casing.

5. In a friction shock absorbing mechanism, the combination with a spring cage; of a combined follower and wedge member, said cage and member being relatively movable toward and away from each other; a friction casing within said spring cage rigid with the same, said casing having interior friction surfaces; friction shoes within the casing slidable on the friction surfaces thereof; cooperating wedge faces on said shoes and combined follower and wedge member; a spring within the casing yieldingly opposing inward movement of the shoes; and spring means within said spring cage at opposite sides of the friction casing yieldingly opposing inward movement of said combined follower and wedge member.

6. In a friction shock absorbing mechanism, the combination with a spring cage; of a combined follower and wedge member, said cage and member being relatively movable toward and away from each other; a friction casing within said spring cage rigid with the same, said casing having interior friction surfaces; friction shoes within the casing slidable on the friction surfaces thereof; cooperating wedge faces on said shoes and combined follower and wedge member; a spring within the casing yieldingly opposing inward movement of the shoes; and additional springs within said spring cage, exterior to said casing, directly opposing inward movement of said combined follower and wedge member.

GEORGE E. DATH.

REFERENCES CITED

The following references are of record in the file of this patent:

UNITED STATES PATENTS

| Number | Name | Date |
|---|---|---|
| 1,860,540 | Haseltine | May 31, 1932 |